US006556434B1

(12) United States Patent
Chan et al.

(10) Patent No.: US 6,556,434 B1
(45) Date of Patent: Apr. 29, 2003

(54) DISK DRIVE MOUNTING STRUCTURE

(75) Inventors: Chao-Kun Chan, Taoyuan Hsien (TW); Lin-Sung Peng, Taoyuan Hsien (TW)

(73) Assignee: Enlight Corporation, Taoyuan Hsien (TW)

( * ) Notice: Subject to any disclaimer, the term of this patent is extended or adjusted under 35 U.S.C. 154(b) by 7 days.

(21) Appl. No.: 09/983,333

(22) Filed: Oct. 24, 2001

(51) Int. Cl.[7] .................................................. G06F 1/16
(52) U.S. Cl. ....................... 361/685; 361/683; 361/686; 312/223.1
(58) Field of Search ........................ 361/679, 683–686, 361/724–727; 312/223.1, 223.2

(56) References Cited

U.S. PATENT DOCUMENTS 5,142,447 A  *  8/1992  Cooke et al. ............... 361/394
5,673,171 A  *  9/1997  Varghese et al. ............ 361/685
6,088,222 A  *  7/2000  Schmitt et al. ............. 361/686
6,317,318 B1 * 11/2001  Kim ........................... 361/685
6,490,153 B1 * 12/2002  Casebolt et al. ............ 361/685

* cited by examiner

Primary Examiner—Darren Schuberg
Assistant Examiner—Yean-Hsi Chang
(74) Attorney, Agent, or Firm—Troxell Law Office PLLC (57) ABSTRACT

A disk drive mounting structure includes a casing, the casing having positioning units disposed in two opposite sidewalls thereof at different elevations, a plurality of carrier plates respectively hooked in the positioning units and adapted for holding disk drives in the casing at different elevations, a plurality of holding down frames respectively pivoted to the positioning units at one side wall of the casing and adapted for holding down the corresponding disk drives on the carrier plates, and a plurality of locking handles respectively pivoted to the positioning units at one side wall of the casing and adapted for locking the holding down frames and the disk drives.

1 Claim, 12 Drawing Sheets

DISK DRIVE MOUNTING STRUCTURE

BACKGROUND OF THE INVENTION

The present invention relates a disk drive mounting structure and, more particularly, to such a disk drive mounting structure, which enables the user to install disk drives quickly without the use of any screws.

Nowadays, computer has become one of the requisite implements in offices, schools, as well as homes. Advanced computers are continuously developed to fit different requirements. In order to minimize space occupation, internal parts of a regular vertical personal computer are arranged in high density. Further, screws and other fastening elements are commonly used to fasten peripheral apparatus to the housing of a computer. It is complicated to remove a disk drive from a personal computer for a repair work.

SUMMARY OF THE INVENTION

The present invention has been accomplished under the circumstances in view. It is the main object of the present invention to provide a disk drive mounting structure, which enables the user to mount/dismount disk drives easily rapidly. It is another object of the present invention to provide a disk drive mounting structure, which eliminates the use of any screws or external fastening elements. To achieve these and other objects of the present invention, the disk drive mounting structure comprises a casing, the casing having positioning units disposed in two opposite sidewalls thereof at different elevations, a plurality of carrier plates respectively hooked in the positioning units and adapted for holding disk drives in the casing at different elevations, a plurality of holding down frames respectively pivoted to the positioning units at one side wall of the casing and adapted for holding down the corresponding disk drives on the carrier plates, and a plurality of locking handles respectively pivoted to the positioning units at one side wall of the casing and adapted for locking the holding down frames and the disk drives.

DETAILED DESCRIPTION OF THE PREFERRED EMBODIMENT

Figure 8:
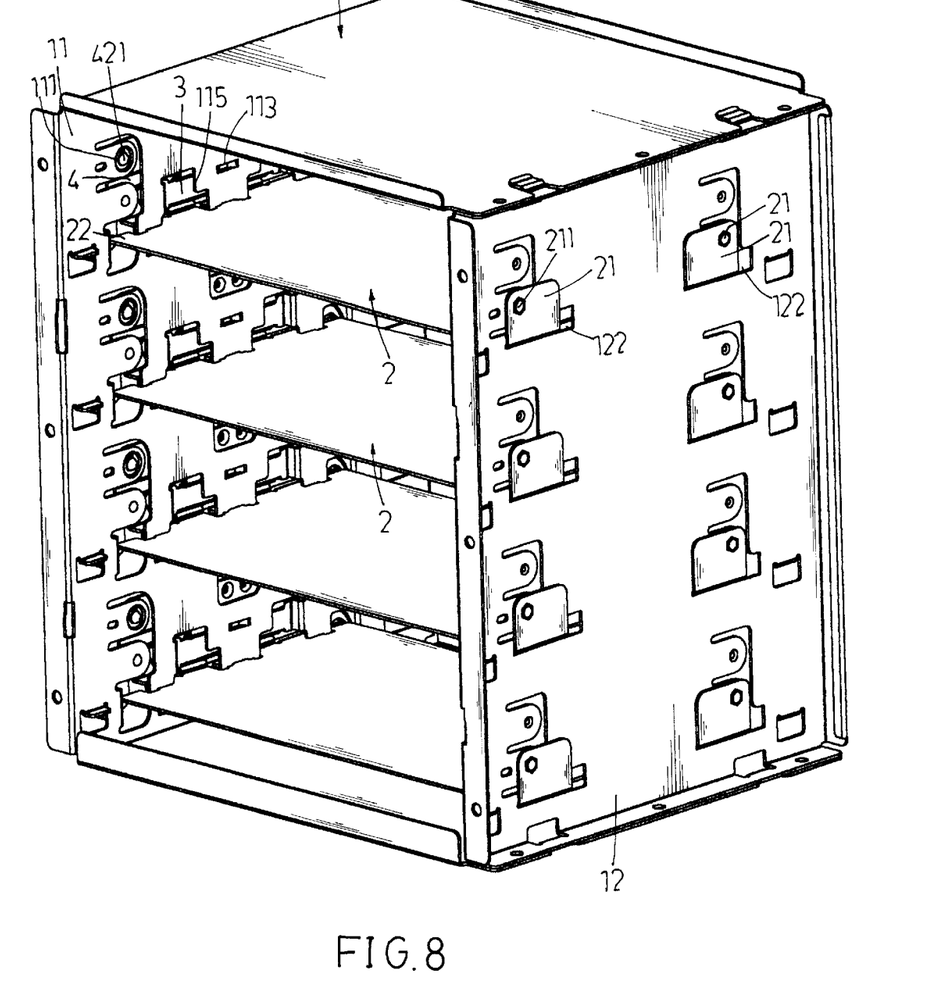
FIG. 8 is an elevational view of the disk drive mounting structure taken from another angle according to the present invention.
Figure 9:
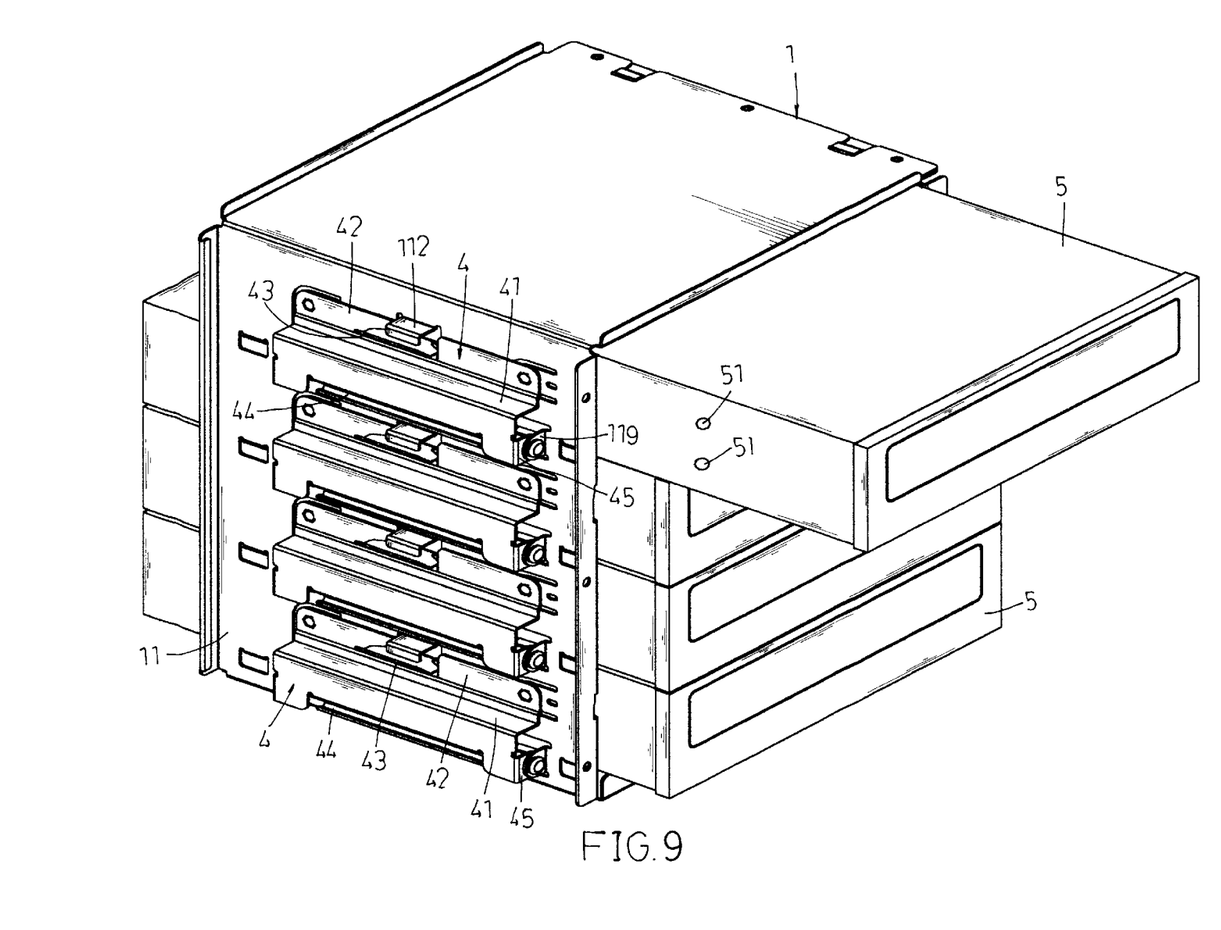
FIG. 9 is an applied view of the present invention, showing disk drives inserted into the casing.
Figure 10:
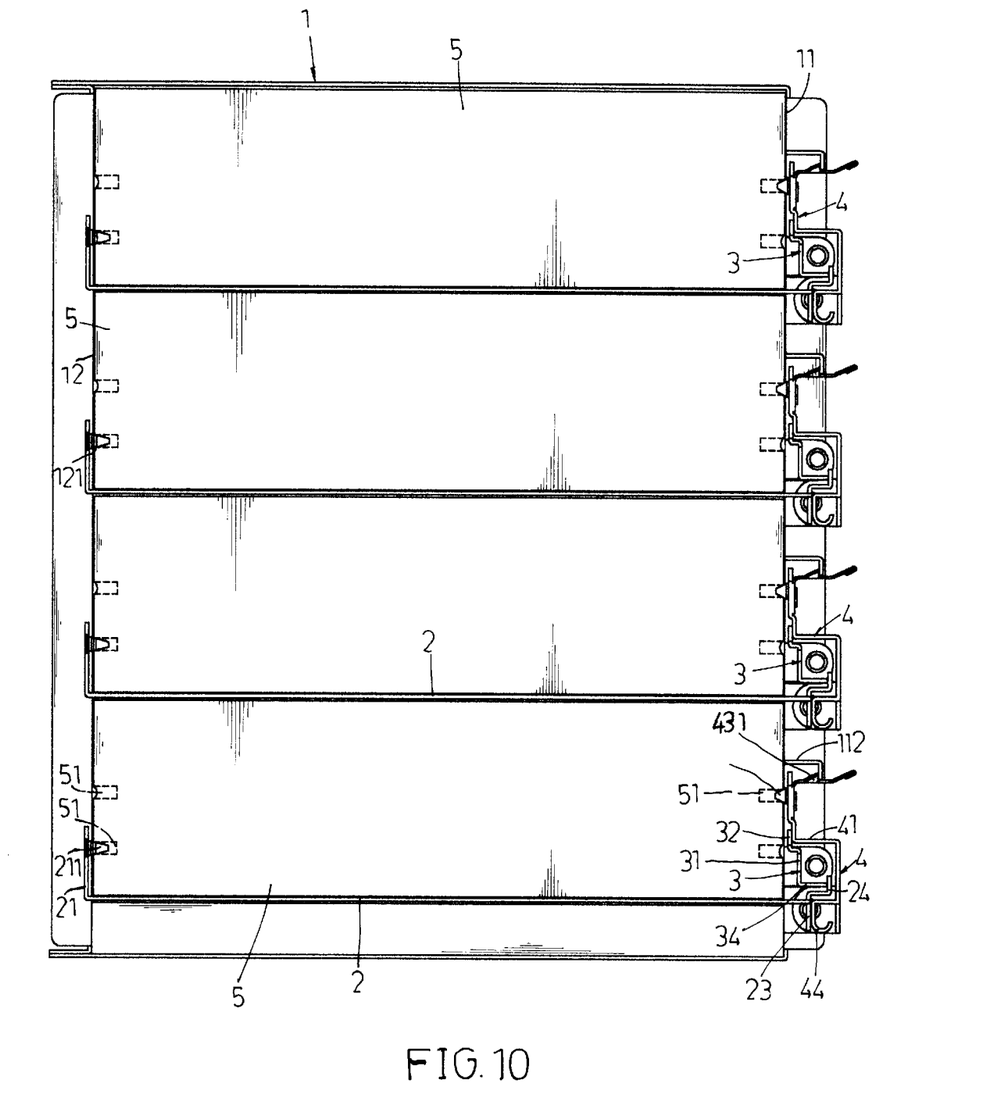
FIG. 10 is a side plain view of the disk drive mounting structure according the present invention.

Referring to FIGS. from 1 through 5 and FIG. 8, a disk drive mounting structure in accordance with the present invention is shown comprised of a casing 1, a plurality of carrier plates 2, a plurality of holding down frames 3, and a plurality of locking handles 4.

Figure 2:
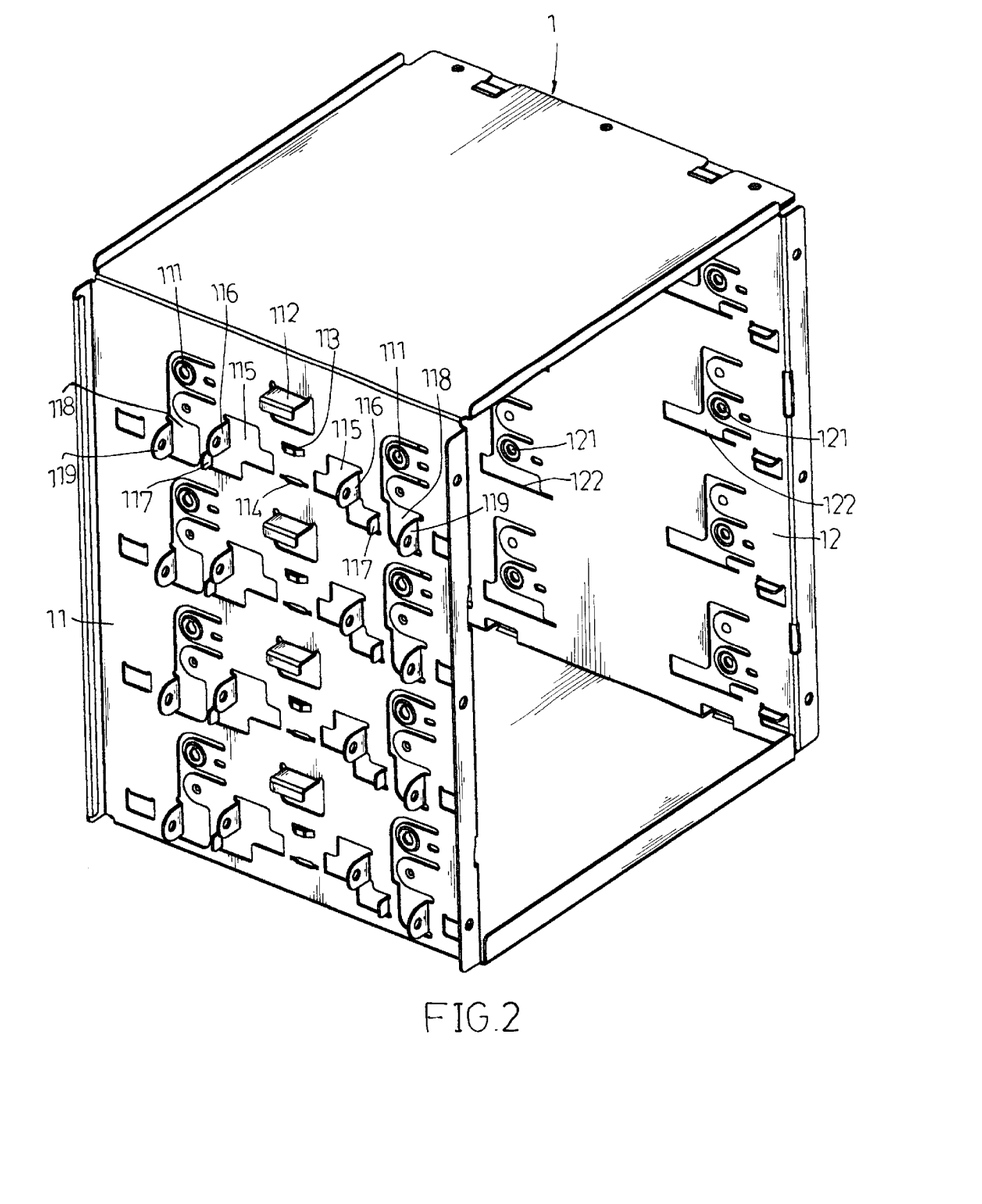
FIG. 2 is an elevational view of the casing for the disk drive mounting structure according to the present invention.

Referring to FIG. 2, the casing 1 comprises a first sidewall 11 and a second sidewall 12 arranged in parallel. The first sidewall 11 comprises a plurality of positioning units arranged at different elevations. The second sidewall 12 comprises a plurality of positioning units arranged at different elevations corresponding to the positioning units of the first sidewall 11. Each positioning unit of the first sidewall 11 comprises two sliding slots 118 symmetrically disposed near two sides, two through holes 111 respectively spaced above the sliding slots 118, two first lugs 119 respectively outwardly extended from the outer side of each of the sliding slots 118, two openings 115 spaced between the sliding slots 118, two second lugs 116 respectively outwardly extended from the outer side of each of the openings 115, two stop flanges 117 respectively outwardly extended from the outer side of each of the openings 115, and a hooked plate 112 and a retaining strip 113 and an elongated hole 114 vertically spaced between the openings 115. Each positioning unit of the second sidewall 12 comprises two through holes 121 disposed near two sides, and two locating holes 122 respectively disposed adjacent to the through holes 121.

Figure 3:
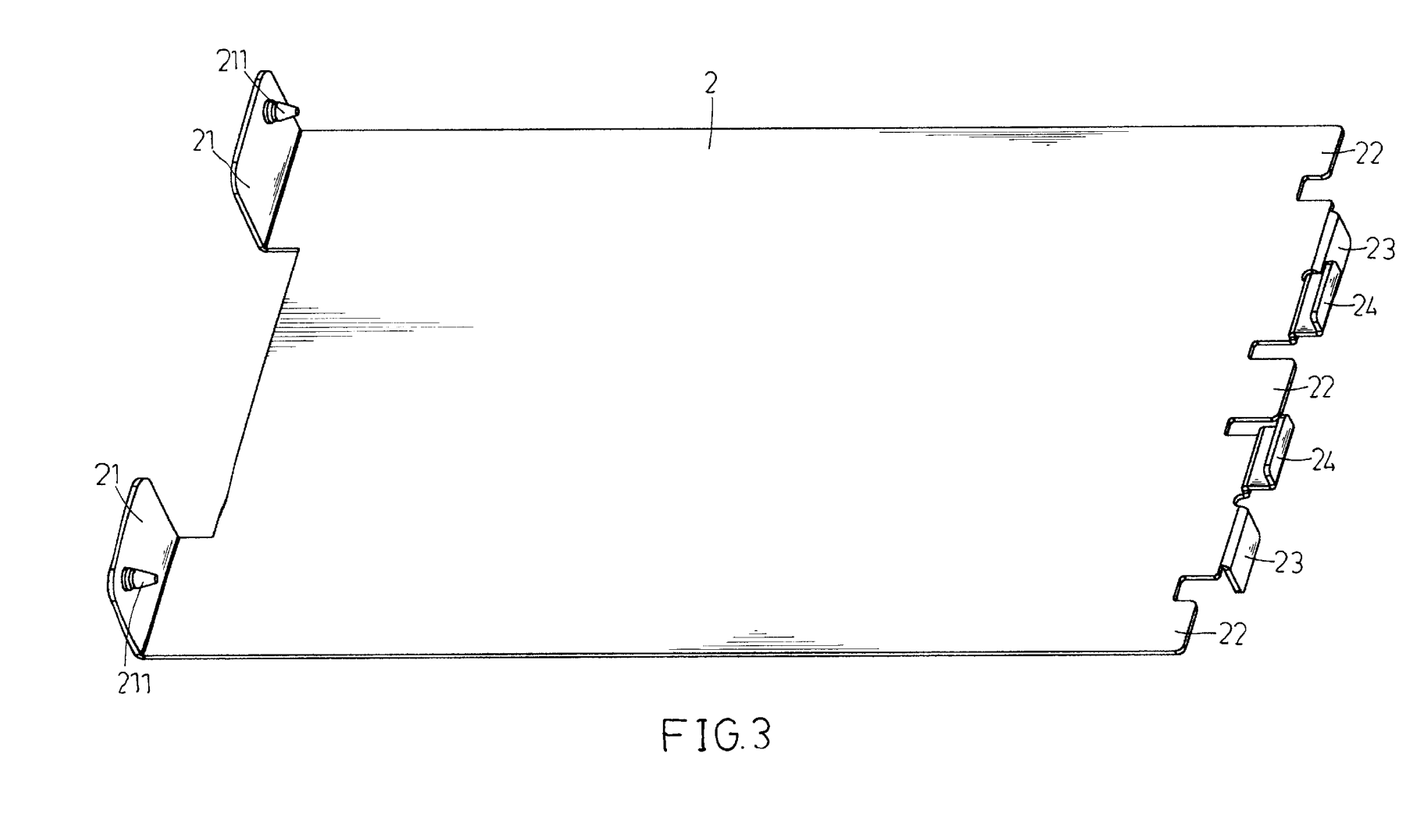
FIG. 3 is an elevational view of a carrier plate for the disk drive mounting structure according to the present invention.
Figure 6:
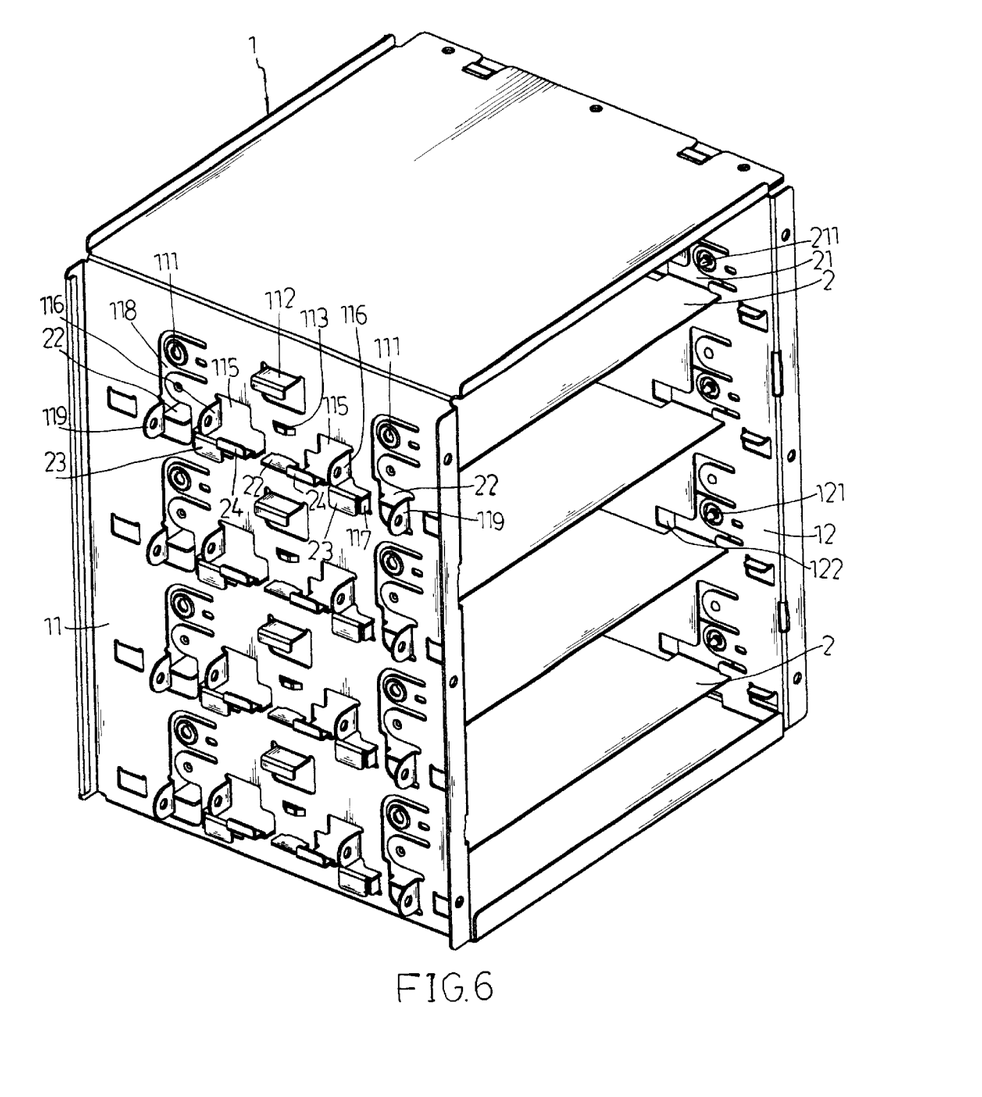
FIG. 6 is an elevational view of a part of the present invention showing the carrier plates mounted in the casing.

Referring to FIGS. 3 and 6, the carrier plates 2 are flat plates mounted in the casing 1 and respectively connected the positioning units of the sidewalls 11 and 12 of the casing 1 for holding disk drives 5. Each carrier plate 2 comprises two mounting flanges 21 bilaterally disposed at the first lateral side thereof and respectively engaged into the locating holes 122 of one positioning structure of the second sidewall 12 of the casing 1, the mounting flanges 21 each having a fixed pin 211 respectively engaged into the through holes 121 of the corresponding positioning structure of the second sidewall 12 of the casing 1, three flat positioning flanges 22 extended from the second lateral side thereof and respectively engaged into the sliding slots 118 and elongated hole 114 of one positioning unit of the first sidewall 11 of the casing 1, and two downward hook plates 23 and two upward hook plates 24 extended from the second lateral side and respectively hooked in the openings 115 of the corresponding positioning unit of the first sidewall 11 of the casing 1. After engagement of the downward hook plates 23 and the upward hook plates 24 in the openings 115 of the corresponding positioning unit of the first sidewall 11 of the casing 1, the corresponding stop flanges 117 stop the downward hook plates 23 in position.

Figure 4:
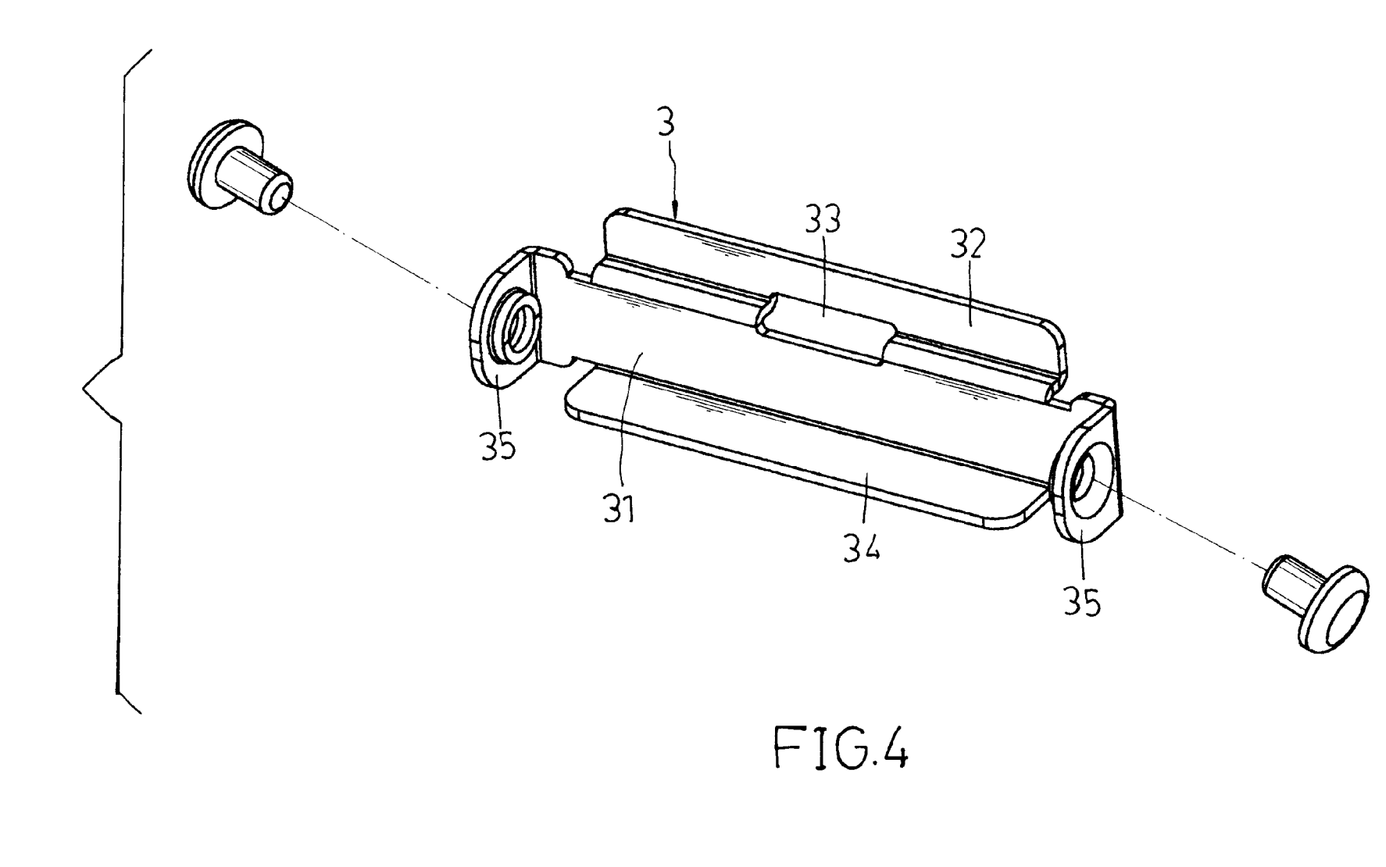
FIG. 4 is an elevational view of a holding down frame for the disk drive mounting structure according to the present invention.
Figure 7:
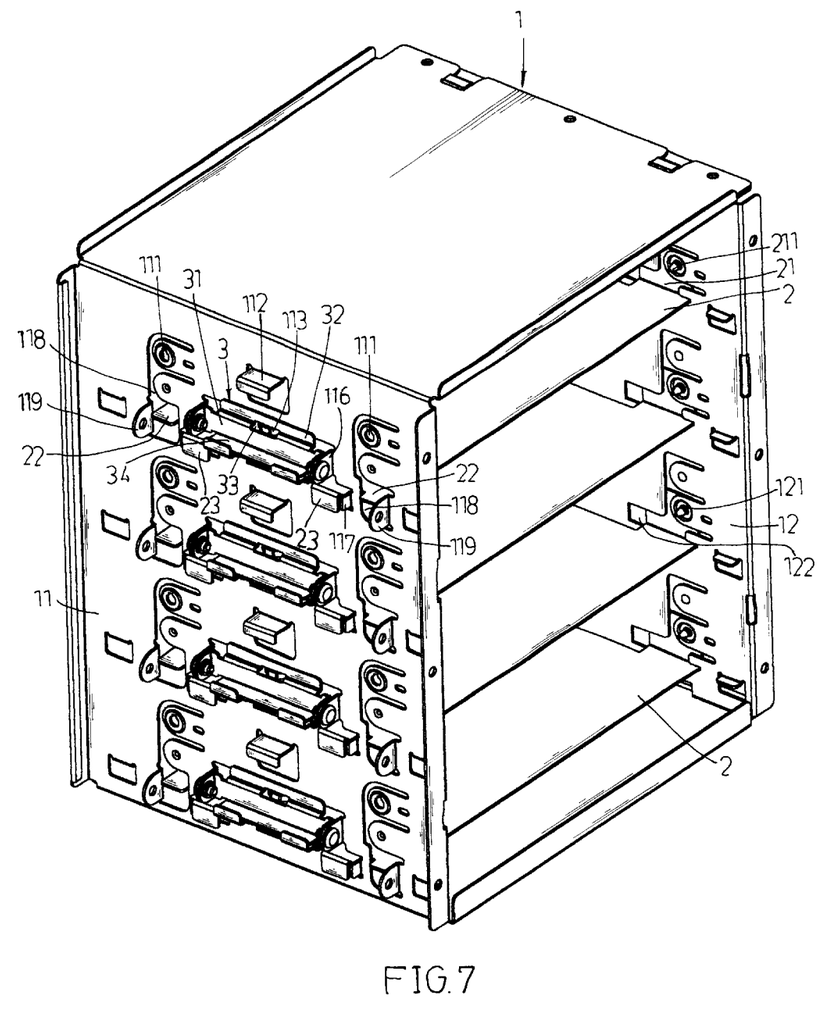
FIG. 7 is an elevational view of a part of the present invention showing the carrier plates mounted inside the casing, the holding down frames fastened to the first sidewall of the casing.

Referring to FIGS. 4 and 7, the holding down frames 3 are respectively fastened to the positioning units of the first sidewall 11 of the casing 1 to secure the carrier plates 2 to the inside of the casing 1. Each holding down frame 3 comprises an elongated base 31, two end lugs 35 respectively perpendicularly extended from the distal ends of the elongated base 31 and respectively riveted to the second lugs 116 of one positioning unit of the first sidewall 11 of the casing 1 by a respective rivet, a first locating flange 34 extended from the bottom side of the elongated base 31 between the end lugs 35 and hooked up with the upward hook plates 24 of one carrier plate 2 in the casing 1, a stop flange 32 extended from the top side of the elongated base 31 between the end lugs 35 and stopped against the first sidewall 11 of the casing 1, and a coupling hole 33 cut through the stop flange 32 and hooked up with the retaining strip 113 of the corresponding positioning unit of the first sidewall 11 of the casing 1.

Figure 1:
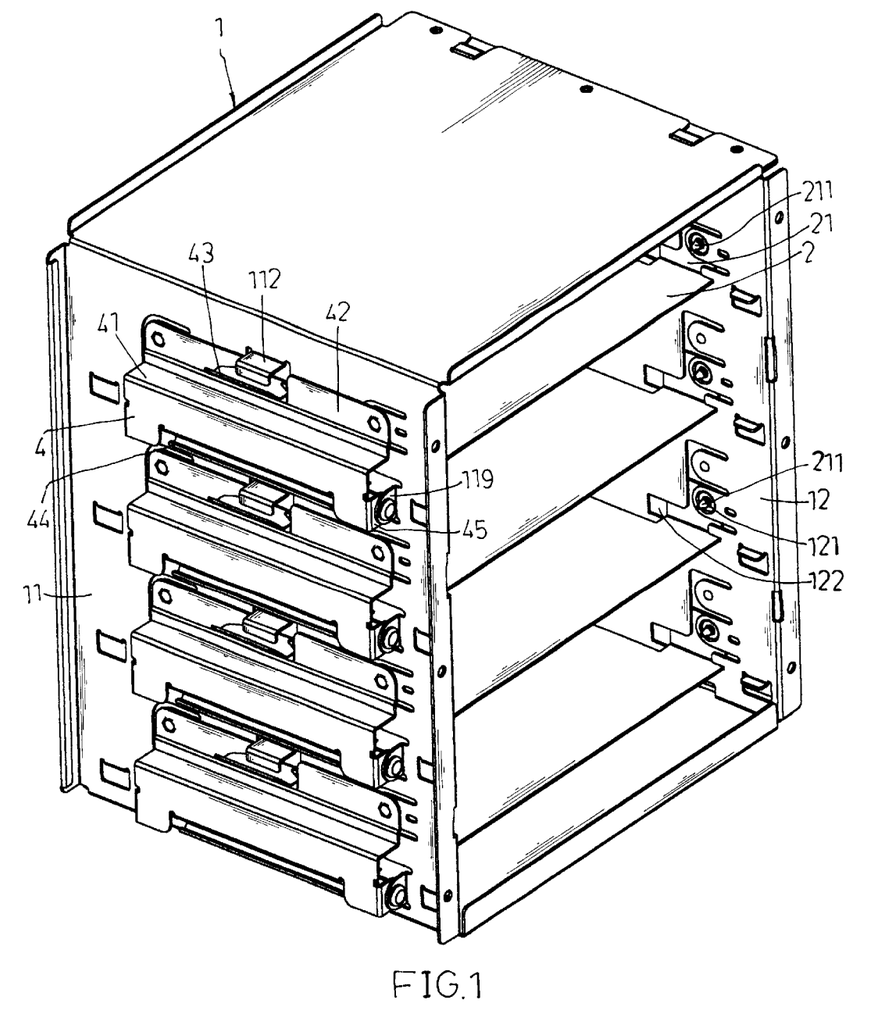
FIG. 1 is an elevational view of a disk drive mounting structure constructed according to the present invention.
Figure 5:
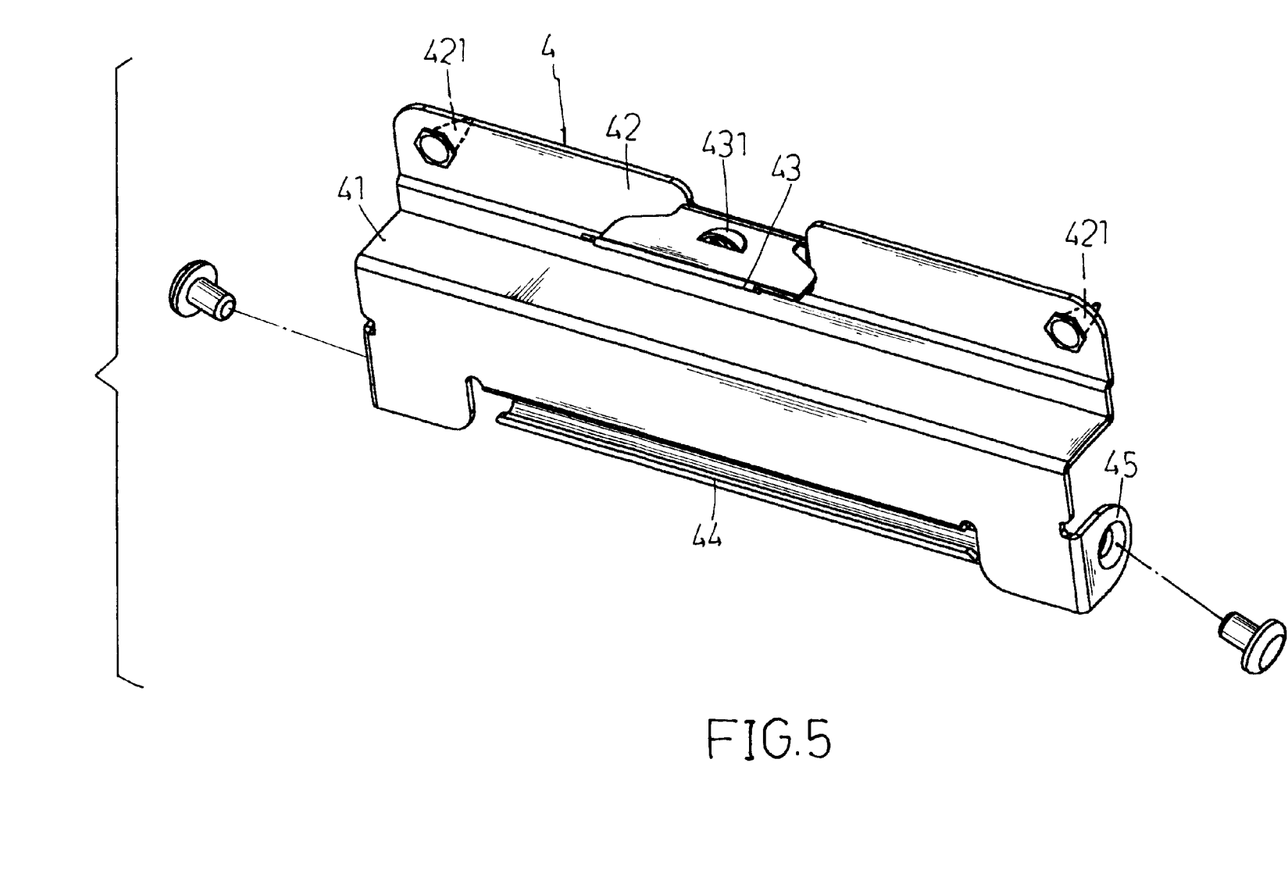
FIG. 5 is an elevational view of a locking handle for the disk drive mounting structure according to the present invention.

Referring to FIGS. 1 and 5, the locking handles 4 are respectively fastened to the positioning units of the first sidewall 11 of the casing 1. Each locking handle 4 comprises a stepped base 41, a top flange 42 upwardly extended from the top side of the stepped base 41, two fixed pins 421 extended from the top flange 42 and respectively engaged into the through holes 111 of the corresponding positioning unit of the first sidewall 11 of the casing 1, a finger plate 43 integral with a middle part of the top flange 42, a protruded retaining portion 431 raised from the top side of the finger plate 43, two end lugs 45 respectively extended from the two distal ends of the stepped base 41 and respectively riveted to the first lugs 119 of one positioning unit of the first sidewall 11 of the casing 1 by a respective rivet, and a pressure strip 44 suspended at the bottom side between the end lugs 45.

Referring to FIGS. from 9 through 12, after installation of the carrier plates 2, the holding down frames 3, and the locking handles 4 in the casing 1, the locking handles 4 are respectively moved to the locking position to lock the carrier plates 2 and the holding down frames 3. At this time, the protruded retaining portion 431 of each locking handle 4 is hooked up with the hooked plate 112 of the corresponding positioning unit of the first sidewall 11 of the casing 1, the stepped base 41 is pressed on the stop flange 32 of the corresponding holding down frame 3, and the first locating flange 34 of each holding down frame 3 pulls the upward hook plates 24 of the corresponding carrier plate 2 outwards toward the first sidewall 11 of the casing 1, thereby causing the pins 211 to be moved with the respective mounting flanges 21 and forced into the through holes 121 of the corresponding positioning structure of the second sidewall 12 of the casing 1 and respective locating holes 51 in the corresponding disk drive 5. When locked, the fixed pins 421 of each locking handle 4 are respectively engaged into respective locating holes 51 in the corresponding disk drive 5.

Figure 11:
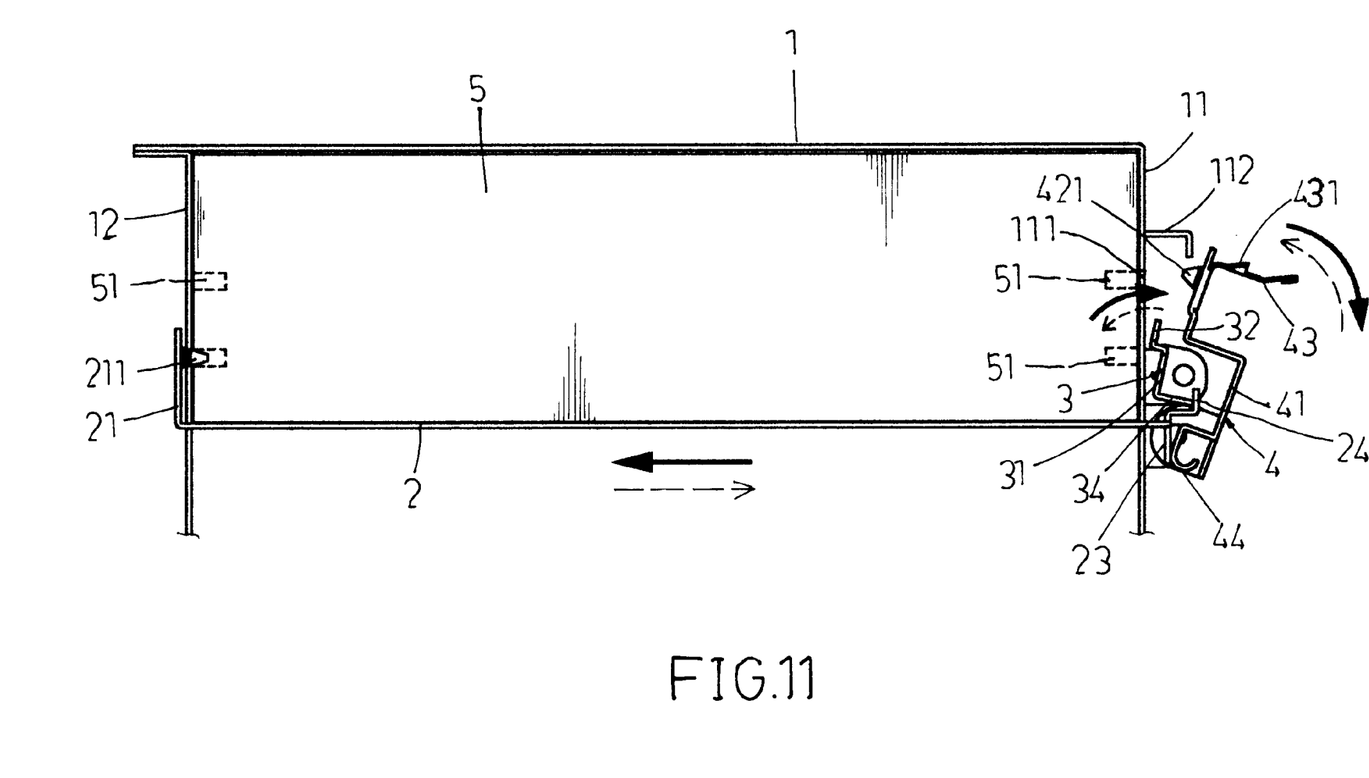
FIG. 11 is a schematic drawing showing the unlocking action of the present invention (I).
Figure 12:
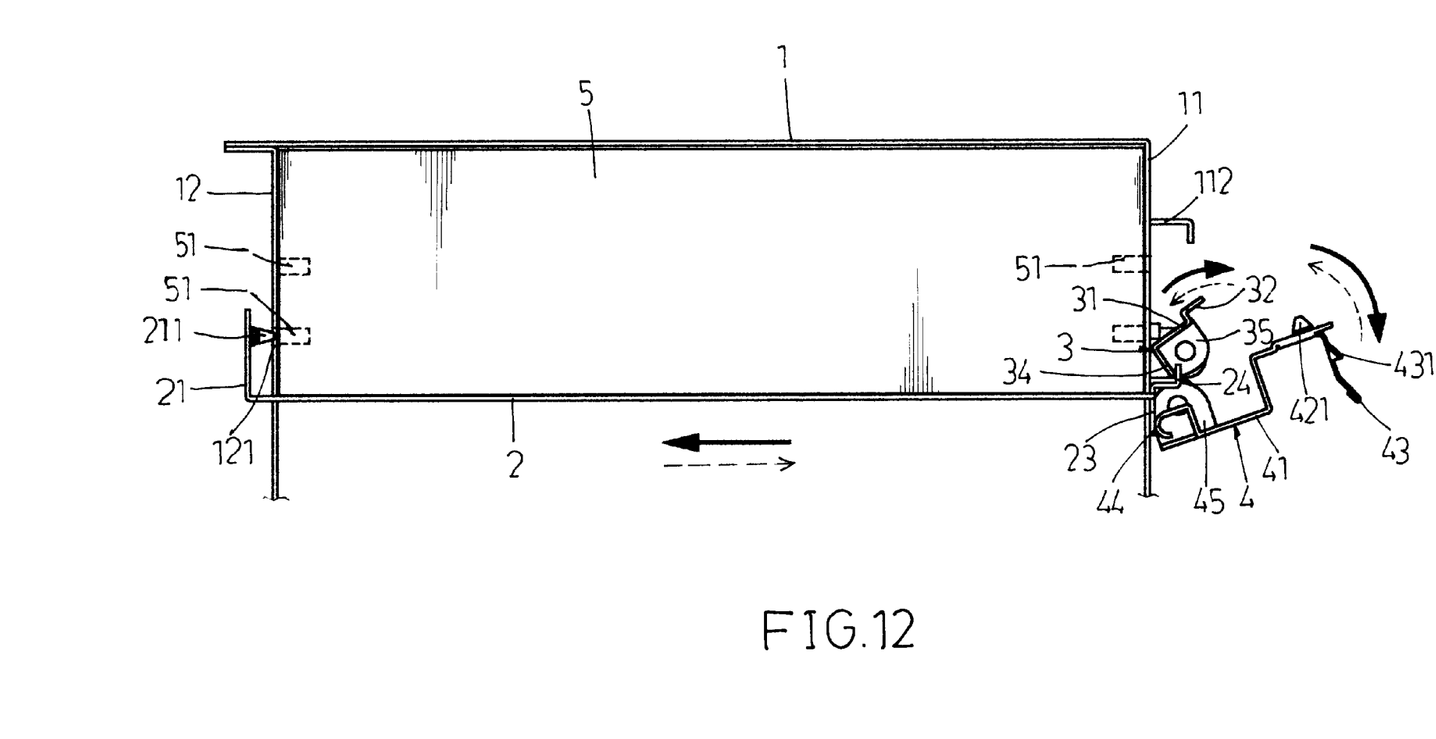
FIG. 12 is a schematic drawing showing the unlocking action of the present invention (II).

When unlocking one disk drive 5, the finger plate 43 of the corresponding locking handle 4 is pressed downwards to disengage the protruded retaining portion 431 from the hooked plate 112 of the corresponding positioning unit of the first sidewall 11 of the casing 1, and then the locking handle 4 is turned outwards to force the pressure strip 44 against the downward hook plates 23 of the corresponding carrier plate 2 and to move the corresponding carrier plate 2 inwards toward the second sidewall 12 of the casing 1, thereby causing the respective pins 211 to be moved with the respective mounting flanges 21 away from the through holes 121 of the corresponding positioning structure of the second sidewall 12 of the casing 1, and therefore the corresponding disk drive 5 is unlocked and can be moved out of the casing 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A disk drive mounting structure comprising:

a casing, said casing comprising a first sidewall and a second sidewall arranged in parallel, said first sidewall and said second sidewall each having a plurality of positioning units arranged at different elevations, each positioning unit of said first sidewall comprising two sliding slots symmetrically disposed at two sides, two through holes respectively spaced above said sliding slots, two first lugs respectively outwardly extended from an outer side of each of said sliding slots, two openings spaced between said sliding slots, two second lugs respectively outwardly extended from one side of each of said openings, two stop flanges respectively outwardly extended from one side of each of said openings, and a hooked plate and a retaining strip and an elongated hole vertically spaced between said openings, each positioning unit of said second sidewall comprising two through holes disposed at two sides and two locating holes respectively disposed adjacent to the through holes;

a plurality of carrier plates mounted in said casing at different elevations and respectively connected the positioning units of said first sidewall and said second sidewall of said casing and adapted to hold a respective disk drive in said casing, said carrier plates each comprising two mounting flanges bilaterally disposed at a first lateral side thereof and respectively engaged into the locating holes of one positioning structure of said second sidewall of said casing, the mounting flanges each having a fixed pin adapted for engaging into the through holes of the corresponding positioning structure of said second sidewall of said casing, three flat positioning flanges extended from a second lateral side thereof and adapted for engaging into the sliding slots and elongated hole of one positioning unit of said first sidewall of said casing, and two downward hook plates and two upward hook plates extended from the second lateral side and adapted for hooking in the openings of the corresponding positioning unit of said first sidewall of said casing;

a plurality of holding down frames respectively fastened to the positioning units of said first sidewall of said casing and adapted for securing said carrier plates to said casing, said holding down frames each comprising an elongated base, two end lugs respectively perpendicularly extended from two distal ends of said elongated base and respectively riveted to the second lugs of one positioning unit of said first sidewall of said casing by a respective rivet, a first locating flange extended from a bottom side of said elongated base between said end lugs and adapted for hooking the upward hook plates of one of said carrier plates, a stop flange extended from a top side of said elongated base between said end lugs and adapted for stopping against said first sidewall of said casing, and a coupling hole cut through said stop flange and adapted for hooking the retaining strip of the corresponding positioning unit of said first sidewall of said casing; and a plurality of locking handles respectively pivoted to the positioning units of said first sidewall of said casing and adapted to lock said holding down frames and loaded disk drives, said locking handles each comprising a stepped base, a top flange upwardly extended from a top side of said stepped base, two fixed pins extended from said top flange adapted for engaging into the through holes of the corresponding positioning units of said first sidewall of said casing, a finger plate integral with a middle part of said top flange, a protruded retaining portion raised from a top side of said finger plate and adapted for engaging the hooked plate of the corresponding positioning unit of said first sidewall of said casing, two end lugs respectively extended from two distal ends of said stepped base and respectively riveted to the first lugs of one positioning unit of said first sidewall of said casing by a respective rivet, and a pressure strip suspended at a bottom side between the end lugs of the respective locking handle and adapted for moving the downward hook plates of the corresponding carrier plate out of position when the respective locking handle is turned outwards to an unlocking position.

* * * * *